United States Patent [19]

Kessick

[11] 4,392,944

[45] Jul. 12, 1983

[54] ALKALI RECYCLE PROCESS FOR RECOVERY OF HEAVY OILS AND BITUMENS

[75] Inventor: Michael A. Kessick, Edmonton, Canada

[73] Assignee: Research Council of Alberta, Edmonton, Canada

[21] Appl. No.: 157,935

[22] Filed: Jun. 9, 1980

[30] Foreign Application Priority Data

Jun. 8, 1979 [GB] United Kingdom ................. 7919999

[51] Int. Cl.³ ............................................. C10G 33/04
[52] U.S. Cl. ..................................... 208/188; 210/708
[58] Field of Search ............... 210/708, 634, 639, 724, 210/725, 737; 208/188

[56] References Cited

U.S. PATENT DOCUMENTS

| | | | |
|---|---|---|---|
| 2,288,857 | 7/1942 | Subkow | 166/266 |
| 2,629,689 | 2/1953 | Green et al. | 210/737 |
| 2,882,973 | 4/1959 | Doscher et al. | 166/266 |
| 3,350,301 | 10/1967 | Hoffman | 210/708 |
| 3,441,499 | 4/1969 | Francis et al. | 208/187 |
| 3,556,980 | 1/1971 | Clark et al. | 208/187 |
| 3,687,845 | 8/1972 | Treat et al. | 210/737 |
| 3,950,245 | 4/1976 | Aliev et al. | 208/187 |
| 4,108,768 | 8/1978 | Sebelik et al. | 210/725 |

FOREIGN PATENT DOCUMENTS 446539  5/1975  U.S.S.R. .............................. 208/188

Primary Examiner—Charles F. Warren
Assistant Examiner—Joseph A. Boska
Attorney, Agent, or Firm—Sim & McBurney

[57] ABSTRACT

Heavy oils, including oil sands, are recovered from mined or in-situ formation by a novel procedure which involves an initial emulsification of the oil with aqueous alkali, usually sodium hydroxide solution, at a pH above about 11. After separation of any residual solid phase, such as sand, the resulting oil-in-water emulsion is inverted by the use of slaked lime to form a water-in-oil emulsion and thereby regenerating part of the sodium hydroxide solution. The water-in-oil emulsion is dewatered to recover the oil phase while the aqueous phase is recycled to the initial emulsification, after removal of clay particles when oil sands are treated.

11 Claims, 2 Drawing Figures

ALKALI RECYCLE PROCESS FOR RECOVERY OF HEAVY OILS AND BITUMENS

FIELD OF INVENTION

The present invention relates to the recovery of oil.

BACKGROUND TO THE INVENTION

There are major accumulations of heavy oils and bitumens at a number of global locations, including, Canada, U.S.A. and Venezuela. Reserves of these crude oils have been estimated at over 100 billion barrels in Canada and the United States and over 3 trillion barrels in Venezuela. These vast resources remain largely untapped for want of commercially viable recovery procedures.

The bitumen may be in the form of oil sands. Oil sands are basically a mixture of bitumen, mineral and water of variable bitumen content. Only those surficial deposits in the Athabasca region of Alberta, Canada are being exploited on a commercial scale at this time. In the deposits, the bitumen content varies up to 18 wt. % and averages about 12 wt. %, water is usually about 3 to about 6 wt. % and the mineral content, predominantly quartz, ranges from about 84 to about 86 wt. %.

At the present time there is one commercial procedure for the recovery of bitumen from these deposits, known as "hot water" process. The latter procedure involves interconnected steps of feed conditioning, bitumen separation, waste disposal and bitumen concentrate cleaning.

The "hot water" process suffers from several drawbacks which currently are tolerated for lack of a viable commercial alternative. A major disadvantage involves the discharge of a tailings stream, which, after removal of sand, settles in ponds to an upper aqueous layer containing less than 5% clay solids which is reusable in the plant and a lower slimes layer containing 5 to 30% clay solids which is extremely difficult to separate into its solids and water components and is not reusable as such.

The net volume of tailings produced by the hot water process in the form of sand and slimes amounts to about 40% greater in volume than the mined tar sand, thus representing a serious backfill problem.

Another disadvantage of the hot water process is that it can be applied satisfactorily only to mined oil sands. The mining of oil sands require the use of expensive large scale earth-moving equipment to remove overburden to expose the oil sands, the use of expensive large scale mining equipment to remove the oil sand and the use of conveying systems to convey the mined oil sand to the plant site. The mining of oil sands is only practical with surficial deposits.

Heavy crude oils are highly viscous and proposals for mining the same rely mainly on heating the oil to decrease its viscosity and render it flowable for recovery from its deposit and upgrading. The energy requirement for such operations is very high, estimated to be the consumption of one barrel of oil for each barrel recovered.

Numerous proposals have been made for improving the economics of recovery of heavy crude oils and bitumens and for alleviating the prior art problems of the commercial hot water process. As far as the inventor is aware, none of such proposals has been implemented.

One such proposal is outlined in U.S. Pat. No. 2,288,857 which describes the formation of an oil-in-water emulsion from the bitumen to facilitate recovery from the formation. The emulsion is subsequently described as being broken to recover the bitumen. This prior art procedure is attractive since the bitumen is converted to a form which renders the same more readily pumpable without the necessity for the considerable energy input to heat the oil to decrease its viscosity. Traditionally emulsions formed from bitumen have been considered undesirable in that they were thought to be extremely stable and, therefore, difficult to separate.

A further patent which describes emulsion formation from bitumen in U.S. Pat. No. 2,882,973 which indicates that the use of a combination of a non-ionic surfactant and alkali is essential for emulsification to be effected. Emulsion separation to recover the bitumen again is described. The use of non-ionic surfactants is highly undesirable in view of their cost and the fact that they are non-recoverable upon emulsion breaking.

SUMMARY OF INVENTION

It has now been surprisingly found that efficient heavy crude oil and bitumen recovery can be effected without the problems of the prior art noted above. The present invention involves emulsification of the crude oil and subsequent breaking of the emulsion. Contrary to the suggestion of U.S. Pat. No. 2,882,973, it has been found that emulsification can be effected in the absence of added non-ionic surfactants and, further, that emulsion breaking can be effected in relatively simple manner, even though the emulsions are stable. Certain specific process conditions, detailed below, must be observed for successful emulsification and emulsion breaking and such specific process conditions have not heretofore been described.

The present invention will be particularly described with reference to the processing of oil sands for the complete recovery of bitumen therefrom but is broadly directed to the recovery of oil from any heavy crude oil deposit. The term "heavy crude oil" as used herein refers to those crude oils which have an API (American Petroleum Institute) gravity value of less than 25°, more particularly less than 20°, and includes bituminous oil deposits, including high grade and medium grade oil sands deposits.

GENERAL DESCRIPTION OF INVENTION

In the first step of the process of the present invention, the oil sand is slurried in water containing at least sufficient strong base to emulsify the bitumen contained in the oil sand, thereby to form an oil-in-water emulsion. The emulsification step requires the use of sufficient strong base to provide a pH of at least 11, and preferably at least 12, in the slurry medium.

The emulsification is thought to result from interaction between the sodium hydroxide with carboxylic acid and phenolic groups in the bitumen or other heavy crude oil. Saponification of ester groups may also occur. The present invention, therefore, is applicable to any crude oil which contains groups which are emulsifiable by strong bases to form stable oil-in-water emulsions. The invention may be used in tertiary recovery of conventional crude oils containing such groups.

The emulsification preferably is effected to result in a relatively high concentration of oil in the emulsion, such as, about 10 to 60 wt. %, so that the volume of aqueous phase which needs to be recycled is minimized, although any desired emulsion concentration may be achieved in the emulsification step.

The concentration of oil attainable in the emulsion to some extent is limited in the case of the oil sand by the ability to wet the sand by the slurry medium. Usually a weight ratio of slurry medium to oil sand of about 1:1 is used, which leads to about 13 wt. % concentration in the emulsion, i.e. the proportion of bitumen in the oil sand. However, the concentration may be built up by reusing the emulsion initially obtained to emulsify further bitumen, and repeating this procedure until the desired concentration level is achieved.

With heavy crude oils which are not associated with substantial quantities of minerals, the direct production of an emulsion containing about 40 to 60 wt. % does not represent a problem.

The emulsification is preferably effected using deaerated water containing the strong base in order to achieve efficient and consistent emulsification and in the case of certain heavy crude oils the use of deaerated water appears to be essential. The presence of dissolved oxygen in the water appears to interfere with the chemical reaction involved in emulsification. Deaeration of the water for use in the emulsification step may be effected in any convenient manner, such as, steam stripping.

The emulsification step may be effected on an in-situ deposit, as well as surface-mined material, the resultant emulsion being pumped to the surface for further treatment. The ability to produce an oil-in-water emulsion consistently is critical to the proper operation of an in-situ mining operation, otherwise formation plugging may occur. The use of deaerated water as the slurry medium in in-situ mining, therefore, is considered essential.

The emulsification may be effected over a wide range of temperatures from about 0° to about 100° C. Elevated temperatures are preferred since emulsion formation is more rapid at the higher temperatures. The preferred temperature range is about 60° to about 80° C. Steam stripping of the water assists in heating the emulsification medium to an elevated temperature.

The strong base which is used in the emulsification step usually is sodium hydroxide. Other strong bases which may be used include lithium hydroxide, potassium hydroxide, quaternary ammonium hydroxides and ethylene diamine, but such strong bases usually are not employed since their relative cost as compared with sodium hydroxide militates against their use.

Quantities of sodium hydroxide used usually vary from about 0.05 to about 1.5 wt. % NaOH on bitumen. The concentration of sodium hydroxide in the aqueous solution contacting the oil sand may vary up to about 0.5 wt. % NaOH, and usually is in the range of about 0.1 to about 0.2 wt. %.

The clay content of the oil sand tends to become dispersed in the aqueous phase emulsion, while the sand separates readily from the emulsion. The solid sand phase can remain in the formation or be separated at the well-head in the in-situ mining operation, or may be separated from the oil-in-water emulsion when mined oil sand is treated.

The oil-in-water emulsion may be allowed to stand to permit some of the clay present in the emulsion to deposit therefrom and thereby facilitate further processing. The emulsion is separated from the deposited clay.

Emulsion breaking to separate the bitumen, in this invention essentially involves conversion of the oil-in-water emulsion into a water-in-oil emulsion using calcium hydroxide (slaked lime or hydrated lime) and dewatering of the resulting water-in-oil emulsion.

The effect of the calcium hydroxide may be assisted by aeration of the emulsion before the addition of the lime to effect oxidation of the bitumen to enhance instability. The quantity of slaked lime used is usually limited to that required to effect the emulsion inversion, since higher quantities tend to lead to greater entrainment of clay in the water-in-oil emulsion. The actual quantity of slaked lime required to effect the emulsion inversion varies depending on the heavy crude oil initially emulsified. The quantity of slaked lime usually varies from about 0.02 to about 1 wt. % on bitumen, preferably about 0.05 to about 0.5 wt. %.

Where the initial crude oil concentration of the oil-in-water emulsion is relatively low, for example, about 10 to about 40 wt. %, the water-in-oil emulsion may be subjected to flotation to separate the same from the aqueous phase as a concentrated product stream containing about 30 to 60 wt. % water. At relatively higher crude oil concentrations, for example, about 40 to about 60 wt. %, flotation separation is not practical.

The addition of the slaked lime to the oil-in-water emulsion has an ion-exchange effect on the bitumen, causing release of some of the sodium ions initially used in emulsification of the bitumen, so that, following dewatering of the water-in-oil emulsion, an aqueous phase is obtained which contains sodium hydroxide and is suitable for recycle to the emulsification step.

The water-in-oil emulsion which results from the emulsion inversion step next is subjected to dewatering by any convenient dewatering technique to separate the bitumen from the aqueous phase. For example, the water-in-oil emulsion may be diluted with an organic solvent for the bitumen, for example, hexane or naphtha, and separation of a bitumen-in-solvent solution from the aqueous phase. Such separation may be effected by centrifugation or simple gravity separation after the addition of a high molecular weight water-soluble partially hydrolyzed polyacrylamide.

An alternative procedure is to add diluent naphtha prior to lime addition to the oil-in-water emulsion followed by centrifugation. This procedure results in direct production of a bitumen-naphtha solution for separation from the aqueous phase, although the emulsion passes through the emulsion inversion under the influence of the slaked lime prior to formation of the bitumen-naphtha solution.

While the latter procedure may seem to be advantageous since the flotation operation is not required to be effected, the procedure nevertheless is less preferred at the lower bitumen concentrations encountered with emulsification of oil sands since high losses of solvent occur through association with clay particles and in the aqueous phase, necessitating large make-up quantities of an expensive chemical.

As noted above, at relatively higher crude oil concentrations of about 40 to about 60 wt. % flotation separation of the water-in-oil emulsion resulting from slaked lime addition is not practical. For these systems, addition of diluent naphtha followed by lime addition is practical since it has been found that the subsequent addition of a partially hydrolyzed water soluble high molecular weight polyacrylamide leads to the separation of the solvent-emulsion solution into three phases, namely, a solvent-oil solution phase, an aqueous sodium hydroxide solution phase containing little residual solvent and a compact clay phase on standing for about 12 to 24 hours. The three phases are readily separated one from another for further processing as described below, although the clay phase is already substantially dewatered.

The polyacrylamide used should have a molecular weight high enough to provide bridging between calcium surfactant molecules through the acrylate groups on the polymer, the acrylate groups resulting from the partial hydrolysis of the polyacrylamide. A number of such polymers are commercially available, one example being that known by the trade mark "Betz 1120" manufactured by Betz.

The quantity of polyacrylamide which is required to effect the phase separation may vary widely, for example, from about 0.5 to about 30 mg/l or higher.

The processing steps effected on the oil-in-water emulsion may be effected at any desired temperature, usually the ambient temperature of the emulsion received from a preceding step.

The solvent-bitumen solution resulting from the above procedures, after separation from the aqueous phase, is processed to recover the solvent for reuse and the bitumen is forwarded for upgrading by conventional procedures. The presence of the lime in the bitumen is not disadvantageous, and indeed may be beneficial in that the sulfur-emissive capability of coke formed in the upgrading operation is decreased, thereby permitting the coke to be more conveniently employed as fuel.

The aqueous phase resulting from the emulsion inversion operation contains clay from the oil sand in fine suspension as well as the recovered sodium hydroxide. The clay suspension is subjected to dewatering by any desired procedure. The dewatering is a relatively time-consuming procedure and requires a large storage area to permit the dewatering to take place.

The dewatering may be effected, for example, by the use of a flocculating agent, such as, additional slaked lime, and the system then allowed to stand for a protracted period to permit separation of flocculated clay. The separation may be assisted and the stand time decreased by the use of centrifugation, freeze-thaw techniques or filtration. When slaked lime is used for the dewatering of the clay suspension, additional quantities of sodium hydroxide are recovered and the calcium form of the clay results. The calcium form of the clay is much more readily dewaterable than the sodium form.

The clear aqueous phase resulting from the clay suspension dewatering step containing the recovered sodium hydroxide then is recycled to the emulsification step, after suitable make-up. This recycle stream is substantially free from calcium ions, although any residual quantities may be removed by suitable softening using sodium carbonate or the like. The dewatered clay is obtained in a form suitable for disposal.

The use of calcium hydroxide in the process of the invention is not detrimental to the emulsification step upon recycle of the separated aqueous phase to the emulsification step. The calcium ions which are added during emulsion inversion and any calcium ions which are added to assist in dewatering the clay suspension to a large extent are involved in ion exchange reactions with the bitumen and the clay which binds the calcium ions to these materials and thereby the calcium ions are removed from the aqueous phase. As mentioned, some minor residual amounts of calcium ion may remain but are readily removed by conventional water softening procedures.

DESCRIPTION OF PREFERRED EMBODIMENTS

Figure 1:
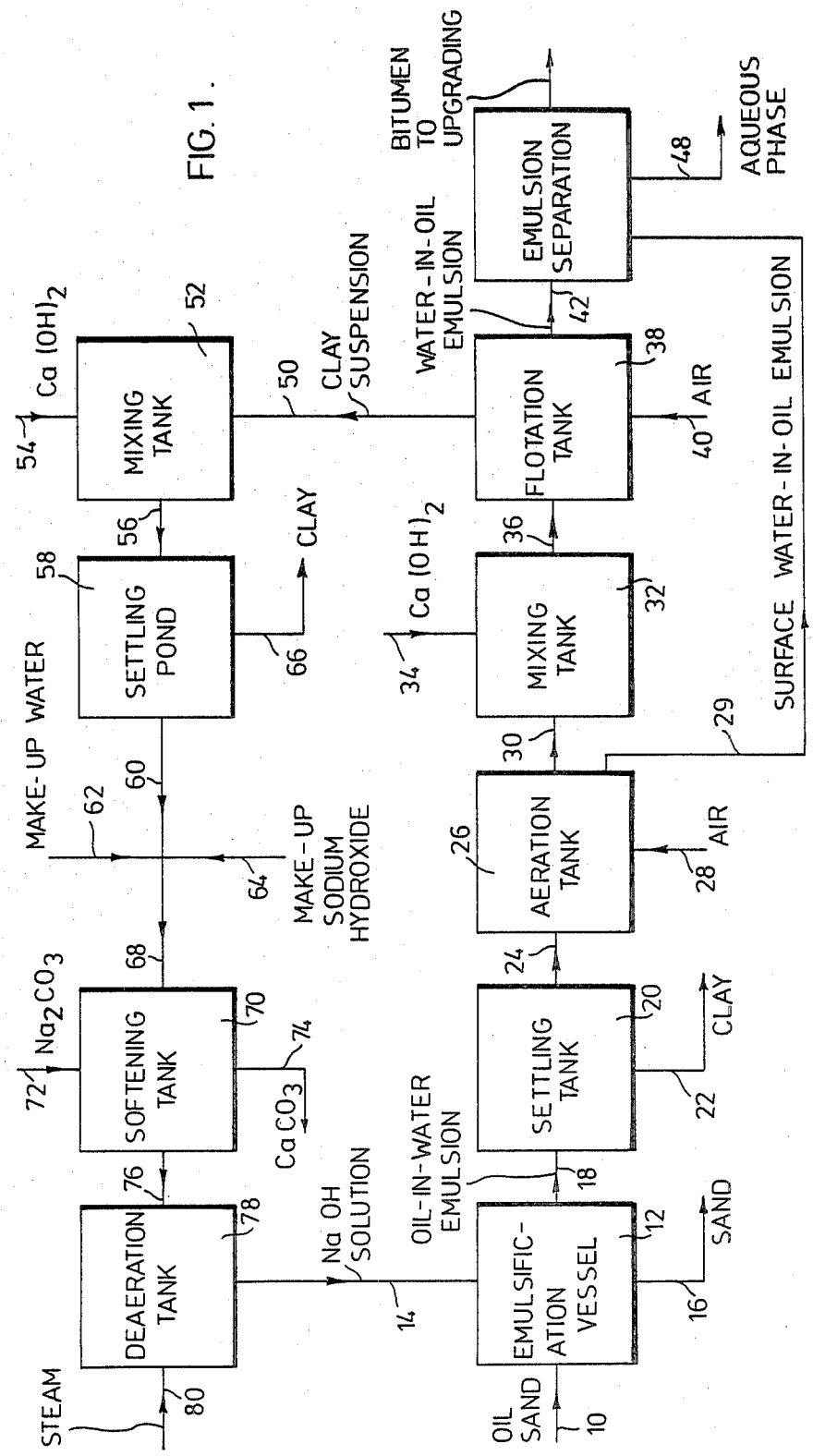
FIG. 1 is a schematic flow sheet of one embodiment of the process of the invention as applied to oil sands.

Referring first to FIG. 1 of the drawings, oil sand in line 10 is fed to an emulsification vessel 12 wherein the oil sand is slurried with a heated deaerated aqueous sodium hydroxide solution having a pH of at least about 12 and a temperature of about 60° to about 80° C. and containing about 0.1 to 0.2 wt. % NaOH fed to the emulsification vessel 12 by line 14. The slurrying action causes the formation of an oil-in-water emulsion from the bitumen component of the oil sand.

After allowing the residual sand to separate from the oil-in-water emulsion, the sand, in compact form, is removed from the emulsification vessel 12 by line 16. The sand in line 16 may be subjected to further washing with alkali to remove residual entrained bitumen emulsion, and finally with water to remove alkali, prior to disposal.

Where an in-situ mining operation is effected, the sodium hydroxide solution in line 14 is pumped into a formation to produce the oil-in-water emulsion in line 18, which is removed from the formation for effecting the further processing steps.

The oil-in-water emulsion is forwarded by line 18 to a settling tank 20 wherein clay is allowed to settle out and is removed, in compact form, by line 22.

The oil-in-water emulsion is forwarded by line 24 to an aeration tank 26 wherein the emulsion is subjected to oxidation with air or other molecular oxygen-containing gas fed by line 28. When air is used in the aeration step, it is preferred to use carbon dioxide-free air to avoid neutralization of alkali. Any bitumen material floated during this step may be removed by skimming and forwarded by line 29 to emulsion separation.

The oxidized emulsion is forwarded by line 30 to a mixing tank 32 wherein slaked lime fed by line 34, usually as a dilute aqueous slurry thereof, is rapidly mixed therewith in an amount of about 0.1 to about 0.3 wt. % $Ca(OH)_2$ on bitumen. The emulsion thereupon more completely inverts to form a coarse suspension of particles of a water-in-oil emulsion.

The coarse suspension is forwarded by line 36 to a flotation tank 38 wherein the particles are coagulated and removed by air flotation using air fed by line 40. The coagulated water-in-oil emulsion is skimmed from the aqueous phase and forwarded by line 42 to any convenient emulsion separation operation 44, such as by solvent addition, centrifugation and solvent recovery, to separate bitumen in line 46 for upgrading by conventional procedures. The aqueous phase resulting from the separation operation 44 in line 48 is recycled to the emulsification vessel 12 following softening to remove residual calcium ions, as discussed below.

The clay suspension resulting from the flotation operation after skimming-off of the water-in-oil emulsion is forwarded by line 50 to a mixing tank 52 wherein further slaked lime is added by line 54, usually as a dilute aqueous slurry thereof, to act as a flocculating agent for the clay.

After rapid mixing of the slaked lime into the clay suspension, the destabilized clay suspension is forwarded by line 56 to a settling pond 58 and allowed to settle to provide a clear supernatant. The clay suspension which results in line 56 is much simpler to separate than is the case of the tailings stream in this hot water process and occupies a substantially smaller volume than the hot water process slimes pond. The dewatering may be enhanced by centrifugation of the suspension, by freezing the same followed by thawing, by filtration, or by a combination of procedures.

The clear supernatant, containing a substantial proportion of the sodium hydroxide used in the initial emulsification step, is removed from the settling pond 58 by line 60 and any make-up water and/or sodium hydroxide required are added thereto by lines 62 and 64 respectively, along with the aqueous phase in line 48.

The lower compact clay layer is suitable for disposal and may be left in the settling pond 58 or may be removed from the settling pond 58 by line 66 for disposal along with the clay in line 22 and the sand in line 16. The mineral by-products of the process, namely sand and clay, thus are obtained as compact solids which are easily handled and readily disposed of.

To avoid any unwanted buildup of calcium ions in the aqueous phase of the system, which would tend to inhibit emulsion formation, the made-up solution in line 68 is subjected to softening in a softening tank 70 by the addition of sodium carbonate or any other convenient softening agent by line 72. Any calcium carbonate which may precipitate is removed by line 74.

The softened aqueous alkali solution is forwarded by line 76 to a deaeration tank 78 wherein air is removed, such as, by steam stripping using steam fed by line 80. The steam stripping also heats the aqueous solution to the desired temperature for emulsification. The resulting heated deaerated aqueous sodium hydroxide solution then is recycled by line 14 to the emulsification vessel.

While each of the individual steps of the procedure described with reference to the drawing is illustrated as being effected in individual vessels or tanks, this is for convenience of illustration and multiple numbers of steps may be effected in the same vessel, if convenient.

Figure 2:
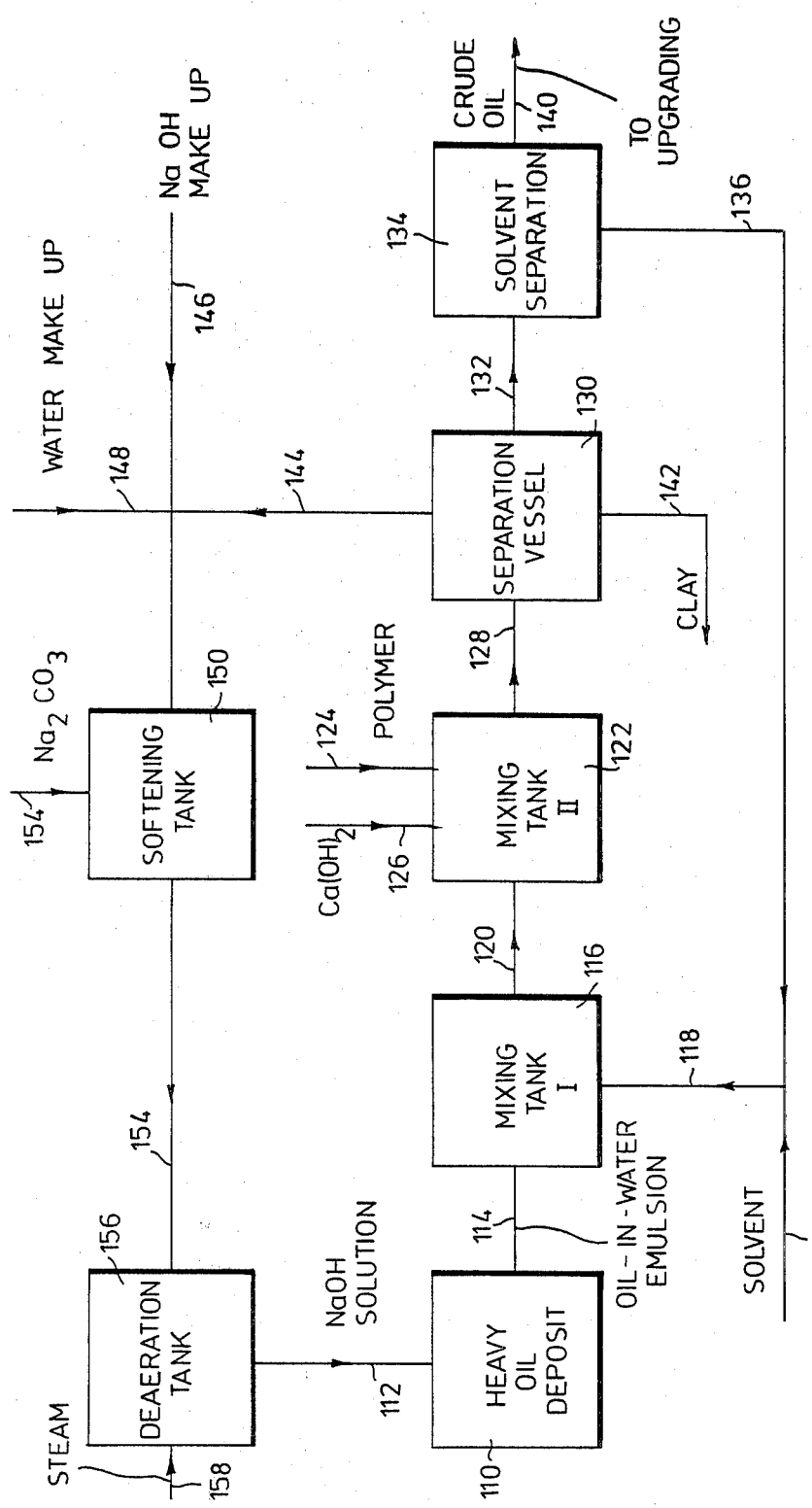
FIG. 2 is a schematic flow sheet of a second embodiment of the process of the invention as applied to a heavy crude oil which is relatively mineral-free.

Referring now to FIG. 2, heavy crude oil which is not contaminated with a substantial proportion of mineral in a formation 110 is contacted with deaerated dilute aqueous sodium hydroxide solution which is pumped by line 112 into the formation to effect emulsification of the crude oil. The sodium hydroxide solution preferably is at a temperature of about 60° to about 80° C. and preferably contains about 0.1 to about 0.2 wt. % NaOH. The oil-in-water emulsion which is formed in the formation is pumped to the surface by line 114.

The emulsification step effected in the formation 110 may be followed by an initial clay settling tank in any suitable tank, such as is described in connection with FIG. 1. The necessity for such a clay settling step depends on the mineral content of the heavy crude oil.

The oil-in-water emulsion in line 114, after clay separation if desired, is passed to a first mixing tank 116 wherein the emulsion is contacted with an oil-dissolving solvent, such as, hexane or naphtha, fed by line 118.

After forwarding the resulting mixture by line 120 to a second mixing tank 122, slaked lime is added by line 126 to cause inversion of the oil-in-water emulsion to a water-in-oil form, preferably in an amount of about 0.1 to about 0.3 wt. % Ca(OH)$_2$ based on bitumen. A high molecular weight water-soluble partially hydrolyzed polyacrylamide is added to the mixing tank 122 by line 126 and the resulting mixture is forwarded by line 128 to a separation vessel 130.

If desired, separate mixing tanks may be used for the separate additions or a single mixing tank may be used and the separation may be effected in the single mixing tank.

If desired, addition of the polyacrylamide may be omitted, and the mixture of solvent, emulsion and slaked lime may be centrifuged to effect phase separation. The oil-in-water emulsion may be aerated prior to solvent addition to destabilize the same, if desired.

The joint action of the addition of solvent, slaked lime and polymer results in the separation of three layers, namely an organic solution of bitumen in the solvent, a clear water layer and a clay layer. Centrifugation usually is not required, although enhancement of separation sometimes may be effected by centrifugation.

The organic solution is removed from the separation vessel 130 by line 132 and forwarded to a solvent separator 134 wherein the solvent is removed and is recycled by line 136 to the solvent addition line 118, with make up solvent being added by line 138. The crude oil is forwarded by line 140 to conventional upgrading.

The clay layer is removed from the separation tank 130 by line 142 for passing to further dewatering. Clay dewatering may be effected in any desired manner, as discussed above with respect to FIG. 1, the separated water being recycled for reuse after softening.

The clear aqueous layer, containing some recovered sodium hydroxide, is forwarded from the separation vessel 130 by line 144 to a softening tank 150 after addition of make up sodium hydroxide and water respectively by lines 146 and 148. If desired, the clay and aqueous layers may be combined and passed to further dewatering. Sodium carbonate is added to the softening tank by line 152 to remove any residual calcium ions before passage by line 154 to a deaeration tank 156. The sodium hydroxide solution is deaerated by stripping with steam fed by line 158 to provide the sodium hydroxide feed solution in line 112.

The procedure of the invention, therefore, enables heavy crude oils to be recovered from heavy crude oil sources, including from oil sands, both from mined oil sand material and in-situ oil sand material, in simple economical manner. With respect to the recovery of bitumen from oil sands, the environmental problems associated with the slimes pond are limited by the process of the invention, in that, although a tailings pond is required for dewatering of the clay, the volume occupied is much diminished and the separability of the aqueous portion of the tailings stream is much enhanced. In addition, the process of the invention is not limited to mined oil sands as the starting material but may use in-situ material, in contrast to the hot water process.

The process of the present invention is superior to other prior art suggestions which have involved emulsification of the crude oil. With respect to U.S. Pat. No. 2,882,973, mentioned above, it is unnecessary to use non-ionic surfactants to achieve emulsification, significantly lower quantities of alkali are employed in this invention than are suggested to be employed in this prior art, and alkali is recovered for recycle in this invention, thereby achieving a considerable economic benefit when compared to this prior art.

U.S. Pat. Nos. 2,288,857 and 2,882,973 do not disclose or suggest the utilization of the emulsion breaking procedure described above wherein controlled slaked lime addition is utilized to cause emulsion inversion followed by dewatering of the resulting water-in-oil emulsion nor the recovery of alkali for reuse in further emulsification.

EXAMPLES

Example 1

This Example illustrates the application of this invention to mined oil sands.

Based on a series of laboratory experiments with respect to the various steps of the process, a mass balance for the process of the flow sheet was arrived at for a 400 g sample of oil sand containing approximately 15 wt. % bitumen, 83 wt. % solids and 2 wt. % water.

The oil sand is agitated for 10 minutes at 70° C. in 400 ml of deaerated 0.1% NaOH solution to produce approximately 375 ml of oil-in-water emulsion containing 12.7 wt. % bitumen and 16.8 wt. % total solids. After separation of the emulsion, 372.5 g of damp sand is subjected to a further 10 minutes agitation at 70° C. in 400 ml of 0.1% NaOH solution to produce an emulsion containing 2.9 wt. % bitumen and 5.8 wt. % total solids. The sand is subjected to a third agitation with 1% NaOH solution to produce an emulsion containing 0.5 wt. % bitumen and 1.1 wt. % total solids.

The sand resulting from the extractions (about 320 g) was found to contain 0.22 wt. % bitumen, representing an extraction efficiency of 99.6% of theoretical maximum. The first extraction was effected to achieve emulsion formation and the second and third extractions were effected to establish extraction efficiency.

The decanted emulsion from the first extraction step is allowed to settle for about ½ hour to provide a clay depleted emulsion containing 12.5 wt. % bitumen and 13.3 wt. % total solids. 13 g of solid clay is separated. The emulsion is subjected to aeration at 70° C. using $CO_2$-free air for about 1 hour, 0.156 g of slaked lime as a 1% slurry is added to the oxidized emulsion by flash mixing for 10 seconds, and the mixture is subjected to dispersed air flotation using $CO_2$-free air at 50° to 70° C. for about 1 hour.

The lime addition and air flotation result in the production of 70 to 90 g of an upper water-in-oil emulsion layer containing 30 to 40% water and 2 to 4% minerals, and a lower fine clay suspension of about 200 ml volume. The upper bitumen layer is removed and subjected to emulsion breaking to recover the bitumen.

The clay suspension is passed through a scavenging filter to recover about 0.8 g of residual water-in-bitumen emulsion. The aqueous phase has a suspended solids concentration 0.80 wt. %, a total solids concentration of 0.97 wt. %, a calcium concentration of 1.5 mg/l and a bitumen content of 0.023 g (about 0.05 wt. % of the total initial bitumen in the oil sand) and a pH of 12.5.

0.1 g of slaked lime as a 1% slurry is mixed with the clay suspension which is allowed to settle for about 12 hours, producing a clear yellowish solution. About 1.7 g (dry weight) of settled solids are recovered. The clear solution has no detectable level of suspended solids and contains 112 mg/l of calcium ions.

200 ml of aqueous sodium hydroxide solution containing 0.2 g of NaOH are added as make-up and 60 mg of sodium carbonate added to soften the water. The resulting solution is deaerated by heating to 70° C. while steam stripping for 10 minutes. The deaerated hot sodium hydroxide solution is recycled to the emulsification step.

Example 2

This Example illustrates the application of this invention to heavy crude oils which do not have substantial mineral content.

Cold bailed heavy crude oil from the Sparky formation at Lloydminster, Alberta was emulsified using 0.1 wt. % NaOH is deaerated water at 70° C. to form an approximately 50 wt. % oil-in-water emulsion.

50 ml portions were mixed with 50 ml of Varsol, the mixtures shaken well at 70° C. and then varying quantities of slaked lime were added. After shaking well at 70° C. for one-half hour, 30 mg/l of Betz 1120 polymer were stirred in and the effect observed. The procedure was repeated at 0.02 mg of $Ca(OH)_2$ per 50 ml of emulsion with the addition of varying quantities of Betz 1120. The effect again was observed. After determining the volume of Varsol layer, the samples in each case were centrifuged for 10 mins. at 2000 rpm.

In the samples where both lime and polymer were added, separation into water, Varsol and clay layers was observed over a 20-hour period, without centrifugation. However, in samples where lime was omitted, the emulsion did not break and in samples where polymer was omitted centrifugation was required to effect phase separation.

The results attained are outlined in the following Tables I and II:

TABLE I

| | (30 mg/l Betz 1120) | | | | | | | | |
|---|---|---|---|---|---|---|---|---|---|
| | Varsol Layer Centrifugation | | | | Clear Water Layer Centrifugation | | | Clay Layer Centrifugation | |
| g $Ca(OH)_2$ /50 ml | Before | | After | | Before | After | | Before | After |
| | Vol. ml. | % $H_2O$ | Vol. ml. | % $H_2O$ | vol. ml. | vol. ml. | pH | ml | ml |
| 0.00 | | | | Emulsion did not break | | | | | |
| 0.02 | 66 | 0.13 | 66 | 0.13 | 23 | 23 | 12.3 | 11 | 11 |
| 0.04 | 68 | 0.12 | 68 | 0.12 | 24 | 24 | 12.1 | 8 | 8 |
| 0.06 | 68 | 0.11 | 68 | 0.09 | 26 | 26 | 12.3 | 6 | 6 |
| 0.08 | — | 0.09 | — | 0.07 | 27 | 27 | 12.3 | — | — |
| 0.10 | 69 | 0.08 | 69 | 0.31 | 25 | 25 | 12.3 | 6 | 6 |

TABLE II

| | (0.02g Ca(OH)$_2$/50 ml) | | | | | | | |
|---|---|---|---|---|---|---|---|---|
| | Varsol layer Centrifugation | | | | Clear Water Layer Centrifugation | | Clay Layer Centrifugation | |
| Betz 1120 | Before | | After | | Before | After | Before | After |
| mg/l | vol. ml. | % H$_2$O | vol. ml. | % H$_2$O | vol. ml. | vol. ml. | ml. | ml. |
| 0 | — | | 67 | 0.07 | — | 18 | — | 10 |
| 5 | 67 | 0.11 | 67 | 0.10 | 33 | 22 | — | 10 |
| 10 | 64 | 0.11 | 67 | 0.05 | 36 | 20 | — | 13 |
| 15 | 66 | 0.09 | 67 | 0.05 | 34 | 23 | — | 10 |
| 20 | 67 | 0.03 | 67 | 0.04 | 33 | 23 | — | 10 |
| 25 | 66 | 0.05 | 68 | 0.04 | 34 | 23 | — | 9 |
| 30 | 67 | 0.07 | 65 | 0.06 | 33 | 25 | — | 10 |

The results of the above Table II demonstrate that the presence of the polymer enables separation to be effected without centrifugation. The centrifugation had little or no effect on the degree of separation of the layers. At a hydrated lime addition of 0.02 g/50 ml of solution, the clear water layer contained about 65 mg/l and a pH of 12.3, indicating that the recovered water layer is reusable in the emulsification step after some softening.

SUMMARY OF DISCLOSURE

In summary of the disclosure, the present invention provides a procedure for the recovery of heavy crude oils from oil sands and other heavy oil deposits which is efficient and economic to operate and which does not possess the environmental problems of the existing procedure. Modifications are possible within the scope of the invention.

What I claim is:

1. A process for the recovery of oil, which comprises:
   contacting a crude oil having an API gravity value of less than 25° C. and containing groups capable of forming surfactants with water containing at least sufficient sodium hydroxide to provide a pH of the water of at least about 11 so as to form an oil-in-water emulsion having a concentration of about 10 to about 60 wt. % of the crude oil,
   contacting said oil-in-water emulsion with slaked lime in an amount of about 0.02 to about 1 wt. % of the oil in said oil-in-water emulsion and sufficient to invert said oil-in-water emulsion to form a water-in-oil emulsion,
   dewatering the water-in-oil emulsion to recover said oil therefrom, and
   recovering an aqueous sodium medium containing at least a major proportion of said sodium hydroxide from said emulsion inversion and dewatering steps.

2. The process of claim 1 wherein said pH is at least about 12.

3. The process of claim 1 wherein said sodium hydroxide is used in an amount of about 0.05 to about 1.5 wt. % based on the weight of said crude oil and said sodium hydroxide solution is of a concentration of up to about 0.5 wt. % NaOH.

4. The process of claim 3 wherein said sodium hydroxide solution has a concentration of about 0.1 to about 0.2 wt. % NaOH.

5. The process of claim 1 or 3 wherein said water is deaerated water.

6. The process of claim 1 wherein said contact is effected at a temperature of about 60° to about 80° C.

7. The process of claim 1 wherein said slaked lime is used in an amount of about 0.05 to about 0.5 wt. % of the oil in the oil-in-water emulsion.

8. The process of claim 1 wherein said dewatering of said water-in-oil emulsion is effected by dissolving the oil in a water-immiscible solvent therefor, separating the resulting solvent-oil solution from the aqueous phase, and recovering the oil from the solvent-oil solution.

9. The process of claim 1 or 8 wherein aqueous medium is recycled to the crude oil contacting step.

10. The process of claim 1 wherein said emulsion inversion and water-in-oil emulsion dewatering are effected by mixing with said oil-in-water emulsion sufficient water-immiscible solvent for said oil to dissolve the same, sufficient slaked lime to invert said oil-in-water emulsion to form a water-in-oil emulsion and sufficient water-soluble high molecular weight partially hydrolyzed polyacrylamide to cause separation of the resulting mixture into a solvent-oil solution phase, an aqueous phase and a mineral solids phase.

11. The process of claim 10 wherein said aqueous phase is recycled to the crude oil contacting step.

* * * * *